(12) United States Patent
Jessen (10) Patent No.: US 10,330,109 B2
(45) Date of Patent: Jun. 25, 2019

(54) TURBO MACHINE HAVING A SEALING UNIT, MAINTENANCE METHOD, AND ASSOCIATED MAINTENANCE DEVICE

(71) Applicant: GRUNDFOS HOLDING A/S, Bjerringbro (DK)

(72) Inventor: Allan Jessen, Tørring (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 613 days.

(21) Appl. No.: 14/916,416

(22) PCT Filed: Mar. 17, 2015

(86) PCT No.: PCT/EP2015/055535
§ 371 (c)(1),
(2) Date: Mar. 3, 2016

(87) PCT Pub. No.: WO2015/140156
PCT Pub. Date: Sep. 24, 2015

(65) Prior Publication Data
US 2016/0195103 A1    Jul. 7, 2016

(30) Foreign Application Priority Data
Mar. 18, 2014  (EP) .................................... 14160600

(51) Int. Cl.
*F04D 29/10* (2006.01)
*F04D 29/12* (2006.01)
(Continued)

(52) U.S. Cl.
CPC ........... *F04D 29/108* (2013.01); *F04D 3/005* (2013.01); *F04D 13/086* (2013.01);
(Continued)

(58) Field of Classification Search
CPC .... F04D 29/108; F04D 13/086; F04D 29/528; F04D 3/005; F04D 29/043; F04D 29/181;
(Continued)

(56) References Cited

U.S. PATENT DOCUMENTS

| 2,057,570 A | 10/1936 | Haentjens |
| 3,957,403 A | 5/1976 | Sloan |
| 7,347,423 B2 * | 3/2008 | Trygg .................. F16J 15/3404 137/468 |
| 2004/0155409 A1 * | 8/2004 | Trygg .................. F16J 15/3404 277/358 |

(Continued)

FOREIGN PATENT DOCUMENTS

| CN | 101210565 A | 7/2008 |
| CN | 201461460 U | 5/2010 |

(Continued)

*Primary Examiner* — Eldon T Brockman
(74) *Attorney, Agent, or Firm* — McGlew and Tuttle, P.C.

(57) ABSTRACT

An axial pump operated in a standing manner has an inner housing part (2), in which a shaft (10) carrying a propeller wheel (4) is mounted. An outer housing part (1) is provided, wherein a flow path (3) for the fluid delivered by the propeller wheel (4) is formed between the inner and outer housing part. The inner housing part (2) is designed for receiving a fluid buffer for at least one seal (15) and includes an opening (19, 20) for the supply and drainage of the buffer. A recess (24, 25) is provided in the outer housing part (1), via which recess the opening (19, 20) is accessible from the outside. A valve (23) is provided in or on the inner housing part (2), with which valve the conduit leading through the opening (19) can be blocked.

16 Claims, 5 Drawing Sheets

(51) Int. Cl.
  *F16J 15/16* (2006.01)
  *F16J 15/3296* (2016.01)
  *F16J 15/40* (2006.01)
  *G01F 23/02* (2006.01)
  *F04D 3/00* (2006.01)
  *F04D 29/043* (2006.01)
  *F04D 29/18* (2006.01)
  *F04D 29/52* (2006.01)
  *F04D 13/08* (2006.01)
  *F01D 9/06* (2006.01)

(52) U.S. Cl.
  CPC ......... *F04D 29/043* (2013.01); *F04D 29/128* (2013.01); *F04D 29/181* (2013.01); *F04D 29/528* (2013.01); *F16J 15/162* (2013.01); *F16J 15/3296* (2013.01); *F16J 15/40* (2013.01); *G01F 23/02* (2013.01); *F01D 9/065* (2013.01)

(58) Field of Classification Search
  CPC ....... F04D 29/128; G01F 23/02; F16J 15/162; F16J 15/40; F16J 15/3296; F01D 9/065
  See application file for complete search history.

(56) References Cited

U.S. PATENT DOCUMENTS

| | | | | |
|---|---|---|---|---|
| 2008/0309012 | A1* | 12/2008 | Hystad | F16J 15/162 |
| | | | | 277/300 |
| 2014/0246859 | A1* | 9/2014 | Obermeyer | F03B 3/06 |
| | | | | 290/54 |
| 2016/0084218 | A1* | 3/2016 | Obermeyer | F03B 15/14 |
| | | | | 415/1 |

FOREIGN PATENT DOCUMENTS

| | | |
|---|---|---|
| CN | 201 697 687 U | 1/2011 |
| CN | 202 329 739 U | 7/2012 |
| CN | 202418045 U | 9/2012 |
| CN | 202468428 U | 10/2012 |
| EP | 1222393 B1 | 12/2008 |
| FR | 1 380 777 A | 12/1964 |
| GB | 533 623 A | 2/1941 |
| GB | 536 639 A | 5/1941 |
| JP | 2002-310091 A | 10/2002 |
| RU | 2005917 C1 | 1/1994 |
| RU | 2387880 C1 | 4/2010 |
| WO | 02/088553 A1 | 11/2002 |

* cited by examiner

TURBO MACHINE HAVING A SEALING UNIT, MAINTENANCE METHOD, AND ASSOCIATED MAINTENANCE DEVICE

CROSS REFERENCE TO RELATED APPLICATIONS

This application is a United States National Phase Application of International Application PCT/EP2015/055535 filed Mar. 17, 2015 and claims the benefit of priority under 35 U.S.C. § 119 of European Patent Application 141 60 600.4 filed Mar. 18, 2014 the entire contents of which are incorporated herein by reference.

FIELD OF THE INVENTION

The invention relates to a flow machine, in particular to an axial pump which is operated in a standing manner, with an inner housing part, in which a shaft carrying a propeller or impeller wheel is mounted, and with an outer housing part, wherein a flow path for the fluid delivered by the impeller wheel is formed between the inner and outer housing part.

BACKGROUND OF THE INVENTION

Flow machines of the previously indicated type are counted as belonging to the state of the art. The present invention departs from the state of the art, as for example the axial pumps produced and marketed by the applicant under the type description Grundfos KPL and Grundfos KWM and are counted as belonging to the state of the art. Hereby, it is the case of pumps which are typically inserted into pipes which have a diameter between 500 and 1,600 mm, with drive powers between approx. 10-1,000 kW. Such axial pumps operated in a standing manner, to which the so-called mixed flow pumps also belong, comprise an inner, essentially rotationally symmetrical housing part which receives the electrical drive motor, whose shaft is led out in a sealed manner at the lower side of the housing and is provided with a propeller as a pump impeller. This propeller is rotatably arranged within an annular channel between the inner housing part and an outer housing part, these housing parts being connected to one another via ribs and forming the delivery channel of the pump. Thereby, the essentially tubular, outer housing part is envisaged for integration into a pipe, in which the pump is arranged, and through which the fluid delivered by the pump, in particular water, is led further on the pressure side.

Such pumps are applied for delivering large quantities of water.

The inner housing part is sealed to the shaft, in order to protect the inside of the inner housing part, in which the electrical drive motor is arranged, from the penetration of delivery fluid. A chamber is provided in the region of these seals, within the inner housing part below the electric motor and the main bearing, and this chamber is envisaged for receiving a fluid buffer, for example oil, which on the one hand cools the seals and on the other hand forms an additional leakage protection.

This oil buffer, which with smaller pumps of this construction type is of a few liters, can be of 30-40 liters with large pumps. The pump is firstly to be removed from the pipe or the corresponding installation space, whereupon an opening is then to be released in the inner housing part, through which opening the oil buffer can then flow away and later be replaced by a new one, in order to change the oil buffer. The pump is brought out of its typically standing operational position, with which the longitudinal and rotation axis is arranged essentially vertically, into a horizontal position, in order to ensure the discharge of the oil through the opening. The pump is accordingly to be rotated so that the filling opening is arranged at the top, for the subsequent filling of the oil buffer. This leads to the fact that the change of the oil buffer is quite cumbersome with such a pump, since the heavy pump must be brought into a lying position and suitably handled there. The emptying and filling via the opening also takes up a considerable amount of time.

SUMMARY OF THE INVENTION

Against this background, it is an object of the invention, to design a flow machine of the known type, such that a change of the fluid buffer is significantly simplified, and the control of the liquid buffer is possible. Moreover, a simplified method for the control of the fluid level of the fluid sealing buffer as well as for draining and filling should be provided, as well as corresponding designs with regard to the device, for carrying out this method The flow machine according to the invention, in particular an axial pump operated in a standing manner, comprises an inner housing part, in which a shaft carrying a propeller (impeller) wheel is mounted, as well as an outer housing part which is typically envisaged for integration into a conduits, such as a pipe or a duct. A flow path for the fluid delivered by the propeller or impeller wheel is formed between the inner and the outer housing part. The inner housing part is designed for receiving a fluid buffer for at least one seal and comprises at least one opening for the supply and discharge of the buffer. According to the invention, a recess via, which the opening in the inner housing part is accessible from the outside, is provided in the outer housing part, and moreover according to the invention, a valve with which a conduit leading through the opening can be shut off is provided in or on the inner housing part.

The basic concept of the present invention is thus to design the flow machine such that an opening in the inner housing part is accessible from the outside through a recess in the outer housing part and that moreover a valve is assigned to the opening, so that this opening can be selectively shut off or opened.

This creates the design precondition, of obtaining an access to the opening from the outside of the machine, in particular from the outside of the outer housing, via the recess, and moreover of a conduit connection to this opening being released or blocked by way of the valve. This design arrangement permits the flow machine, in particular the axial pump envisaged for standing operation, to be handled in a standing manner with the control or on changing the buffer. Thereby, the opening is usefully arranged such that with a standing arrangement of the machine, the buffer can be completely removed and replaced again, through the opening. Due to the arrangement of the valve, it is possible to provide a fluid-tight coupling device in the region of the opening, for example an inner thread for screwing in a pipe, which then by way of opening the valve is conduit-connected to the inside of the inner housing part, in particular of the buffer chamber, in a targeted manner. It is particularly advantageous if the valve is designed as a check valve and specifically as a controllable check valve, since in this manner it is always ensured that fluid cannot inadvertently escape from the buffer chamber, but only if the valve is opened in a targeted manner. Such a check valve thus ensures the automatic closure of the opening and thus a simple operation. Only a targeted controlled intervention releases the conduit connection.

If, as is advantageous, the housing parts are arranged and aligned around a vertical middle longitudinal axis of the flow machine in an essential rotationally symmetrical manner, it is then useful to arrange the recess in the outer housing part in a radially flush (aligned) manner to the opening in the inner housing part, so that the opening is accessible in a simple manner with a tool or pipe section which runs essentially in a straight line. Thus, a straight pipe piece can be applied, in order to create a conduit connection between the opening and the outer side of the machine.

Usefully, a receptacle for the buffer, typically a buffer chamber which is preferably hermetically closable, and specifically by way of closing the opening, is formed within the inner housing part. The opening according to one advantageous further development of the invention is arranged at the height of the base of the receptacle or this chamber, since then no further pipework within the housing inside is necessary and quasi a base-side discharge is formed. Thereby, at the height of the base of the receptacle is to be understood with regard to a standing arrangement of the pump, i.e. with an essentially vertical longitudinal axis of the machine. The opening thus forms a discharge which is close to the base, via which discharge the fluid buffer can be completely removed. As the case may be, the buffer can be filled via this opening, which is particularly advantageous since then the buffer change can take place through one and the same opening, and no further assembly or disassembly is required.

Basically, the emptying and filling via a single opening in the inner housing part is possible, wherein this is either effected in a manner supported by pressure and/or via a further conduit which is introduced through this opening and via which the remaining chamber volume is pressure-compensated by way of gas, typically surrounding air. Then on filling, the gas is withdrawn from the chamber, or on emptying, gas is filled into the chamber. The further development which is alternatively envisaged according to the invention, with which a closable, further (upper) opening is provided above the opening and in the inner housing part, and a recess radially flush thereto in the outer housing part, is more advantageous with regard to the handling. Then this upper opening can advantageously be used for filling, or for pressure compensation on emptying the buffer chamber. Moreover, the emptying procedure can be significantly accelerated via this upper opening, for example by way of subjection to compressed air, by which means a buffer change is possible in only in a few minutes, even with large machines with 30 liters or more buffer volume.

Usefully, the openings as well as the recesses which are flush thereto are closable in each case with a closure body, wherein these closure bodies are advantageously designed such that they terminate in a flush manner to the flow channel, i.e. at the openings to the outer side of the inner housing part and at the recesses to the inner side of the outer housing part. In this manner, the flow path within the pump is not inhibited by the openings/recesses, and also there is no danger of particles or other contamination which could inhibit the access, settling in this region.

According to an advantageous further development of the invention, a sensor, for example a water sensor can be integrated into a closure body for an opening of the inner housing part, so that an additional monitoring of the fluid buffer can be effected by way of the sensor. The sensor thereby usefully operates in a wireless manner and communicates with the motor electronics in the upper region of the inner housing part e.g. by radio.

So as to attach the closure in a rapid, simple and durable manner, it is useful if this is provided with an outer thread which meshes into a correspondingly designed inner thread of the associated recess or the associated opening. Such closure bodies on the radially outer lying side are typically provided a positive-fit recess for a tool which can engage there and fixedly hold the closure body, e.g. magnetically or also mechanically, wherein this is removed from the thread.

With a flow machine designed in such a manner, it is not only possible to exchange the buffer in a rapid and simple manner, but moreover the control of the fluid level of the buffer is also possible. According to the invention, for this, one envisages one or more closure bodies present as the case may be, being removed, whereupon a pipe section of a fluid level control device is led from the outside through the recess in the outer housing part and is fixed in the opening in the inner housing part and which is flush thereto, by way of screwing in A bayonet connection can alternatively be provided here. The pump-side valve in or on the opening and one or more valves of the fluid level control device are then activated to open, whereupon the fluid level within the inner housing part is determined by way of the device. After determining the fluid level, the valves are activated to close and the device removed, whereupon the closure bodies present as the case may be are inserted again. Thus, with a standing machine, it is possible to determine the fluid level of the buffer without having to have this drained, in a simple and rapid manner with a few hand grips.

The method according to the invention, for draining fluid, envisages the machine being placed on the ground or alternatively being suspended by a crane, in a standing manner, i.e. with an essentially vertically arranged longitudinal axis, whereupon closure bodies which are present as the case may be are removed and a pipe section is led from the outside through the recess in the outer housing part and is fixed in the opening which is flush thereto and is in the inner housing part. Thereby or thereafter, the pump-side valve is activated to open and the liquid is withdrawn through the pipe section out of the pump housing, whereupon the valve is closed, the pipe section removed and the closure body is inserted again.

Thereby, it is particularly advantageous if a closure body is removed from the upper recess in the outer housing part, whereupon the closure body closing the upper opening of the inner housing part is removed and the closure bodies after draining the fluid are attached again in the reverse sequence. Depending on the arrangement of the upper closure body, the closure body can also remain in the upper recess in the outer housing part, if the closure body for the upper opening of the inner housing part is accessible from above by way of engagement into the annular channel formed between the outer and the inner housing part.

The opening of the upper opening accelerates the fluid drainage through the lower opening, since air can flow afterwards into the buffer chamber by way of this. The emptying can be further accelerated by way of the buffer chamber being subjected to pressure, for example compressed air, via the upper opening.

In an analogous manner, according to the invention the sealing buffer can be filled by way of a closure body, inasmuch as is still present, firstly being removed preferably from the upper recess in the outer housing part, whereupon the closure body is removed from the upper opening of the inner housing part, and a pipe section is led from the outside through the upper recess in the outer housing part and is fixed in the upper opening which is flush thereto and which is in the inner housing part. Thereafter, the filling with fluid can be effected through the pipe section, wherein the pipe section is removed after the filling has been effected, and the closure bodies are reattached in the reverse sequence. Basically, the filling can also be effected through the lower opening, and then the upper opening can also be opened so that excess air can escape, for accelerating the method. A pressure-supported filling is possible with this arrangement, which accelerates the filling process.

According to the invention, a fluid level control device is provided, with which the fluid level in the buffer chamber is determined and can be checked. This device comprises a pipe (tube) section with an outer thread at the free end of the pipe section. A rod-like part which lies within the contour formed by the outer thread and which projects beyond the outer thread in the axial direction is attached within this pipe section. The tubular section at its other end is bent by 90° and comprises a transparent section with at least one marking. The rod-like part serves for opening the closure body of the check valve arranged directly behind the opening within the inner housing part within the buffer chamber, when screwing the pipe section into the opening. Thereby, the device for controlling the filling level is to be attached such that the tubular section bent by 90° is arranged vertically upwards and parallel to the longitudinal axis of the machine, thus vertically given a standing machine. Then the filling level can be determined in the region of the transparent section. The filling level height which is also present within the buffer chamber is displayed in the transparent region, since these are connected to one another according to the principle of communicating pipes.

According to an advantageous further development, the filling level control device is designed such that the pipe section close to its ends is provided with a shut-off valve in each case. These shut-off valves are opened for the purpose of fluid level control and closed again thereafter, so that the fluid located in the device cannot inadvertently get to the surroundings when unscrewing. A device according to the invention for draining the fluid buffer of a seal of a flow machine, in particular of an axial pump operated in a standing manner, comprises a pipe section with an outer thread at the free end of the pipe section, as well as a rod-like part which lies within the contour formed by the outer thread and projects beyond the outer thread in the axial direction. The device is moreover provided with a shut-off valve. After or on screwing the thread into the lower opening of the inner housing part, the check valve is opened via the rod-like part which can either be fixedly attached on the pipe section or which is led within the pipe section in an axially movable manner and is controllable from the outside, and this opening is effected by way of the rod end pressing against the closure body and lifting this from its sealing seat. The shut-off valve is usefully provided in order to be able to control the drainage at the device, but as the case may be can however also be done away with if other means acting in the same manner are provided, for example a suctioning pump which is conduit connected to the end of the pipe section which is remote from the machine.

Finally, the invention envisages a device for filling the sealing buffer, and this is formed of a straight pipe section with an outer thread at the free end and of a part which is widened in a funnel-like manner and is angled by 90° at the end of said pipe section which is away from the machine. Such a device can be screwed through the upper recess into the upper opening of the inner housing part, whereupon the filling procedure is effected by way of filling the fluid into the part which is widened in a funnel-like manner. Since the upper opening is arranged above the fluid level of the buffer, the almost completely emptied filling device can be screwed out of the upper opening after the filling procedure has been effected, whereupon firstly the opening and then the recess which lies therebehind in a flush manner and is in the outer housing part are provided with suitable closure plugs.

The solution according to the invention permits a very rapid and comfortable control as well as the change of the buffer, without the machine having to be moved out of its standing position. Thereby, the device for fluid level control, the device for filling the sealing buffer and the device for draining the buffer can be designed in a combined manner, specifically with a pipe section and a thread at the free end as well as a rod arranged therein for the control of the check valve and with a 90° bend at the other end, on which then the funnel-like part or the transparent pipe section for filling level control are selectively screwed. For drainage, the 90° pipe bend is rotated by 180° so that the end is directed downwards. Thereby, a shut-off valve can be provided within the pipe section or also at another suitable location.

The invention is hereinafter explained in more detail by way of one embodiment represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

DESCRIPTION OF THE PREFERRED EMBODIMENTS

The Figures show the axial pump according to the invention. With regard only to basic aspects of construction, the axial pump which is represented in a longitudinal section in FIG. 1 and which is operated in a standing manner, corresponds to the state of the art, typically to basic construction aspects according to the Grundfos pumps of the type KPL (propeller version) or KWM (impeller version). An outer housing part 1 annularly surrounds an inner housing part 2 and between these housing parts 1 and 2 forms an annular flow channel 3 for the delivery flow which is produced by a propeller 4 (or alternatively impeller), from a lower inlet opening 5 to an upper outlet opening 6 which annularly surrounds the inner housing part 2. The pump is provided for integration into a cylindrical hollow body, e.g. a pipe, and for this at the upper end of the outer housing part 1 comprises a peripheral seal 7 with which the outer housing part 1 is sealed with respect to the installation space.

Figure 1:
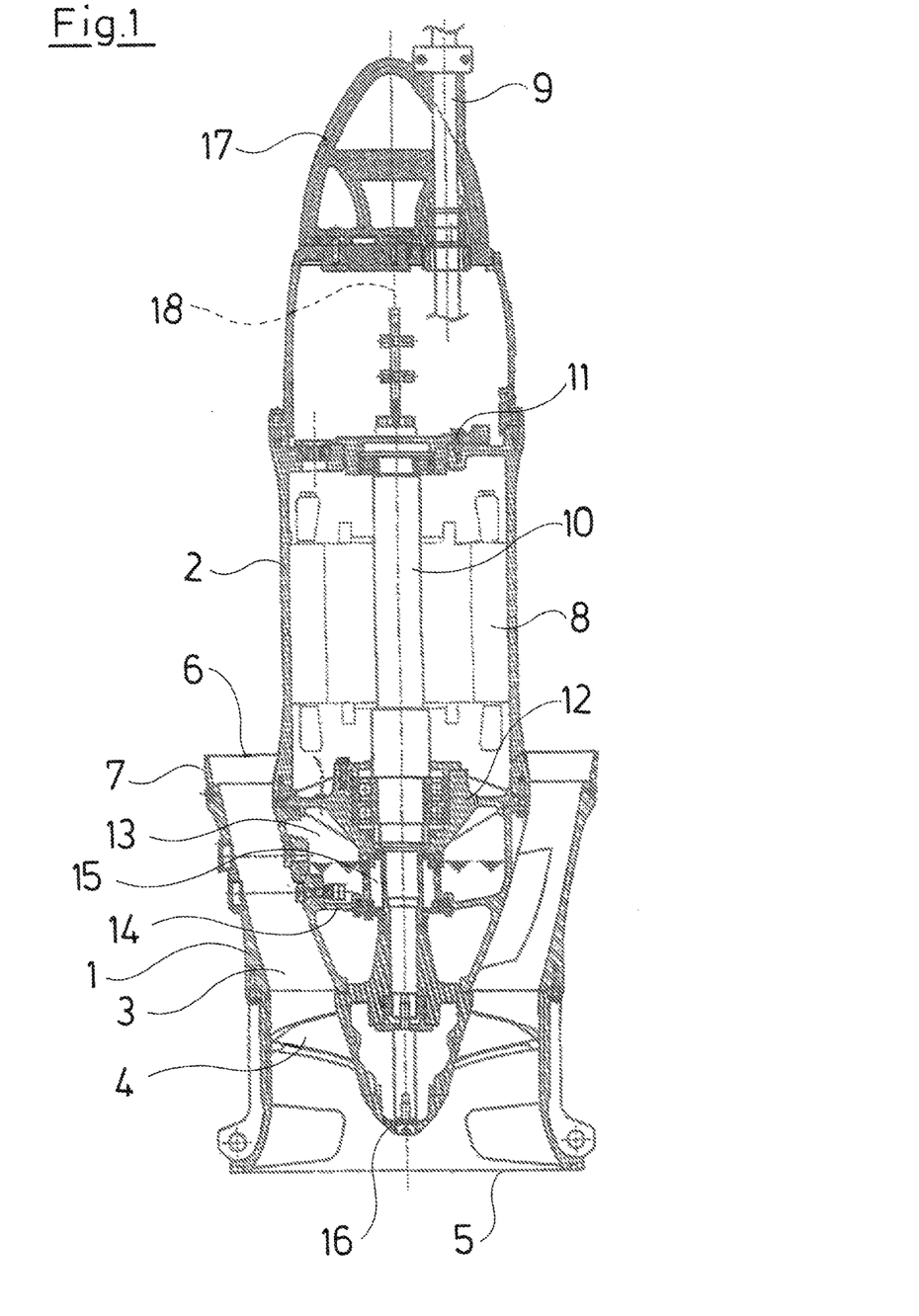
FIG. 1 is a greatly simplified schematic representation of a longitudinal section through an axial pump according to the invention which is operated in a standing manner.

The inner housing part 2, in the uprightly standing operational position shown in FIG. 1 extends significantly beyond the outer housing part 1 and together with the hollow body which is not represented in FIG. 1 and in which the pumps sits, continues the annular channel formed by the outlet opening 6 upwards.

The outer and the inner housing part 1 and 2 are connected to one another via ribs which pass through the flow channel 3. The inner housing part 2 receives an electrical drive motor 8 that has a supply cable 9 that is led upwards out of the housing 2. The motor 8 comprises a shaft 10 which comprises an upper, motor-side end which is mounted in a transverse wall 11 of the inner housing part 2 and otherwise extends downwards with its free end. A further mounting is provided within a transverse wall 12 of the inner housing part 2 and connecting to the drive motor 8 at the bottom. This lower transverse wall 12 which receives the lower bearing of the shaft 10 delimits a chamber 13 to the top, said chamber 13 being for a fluid sealing buffer, hermetically closable and provided within the inner housing part 2. This chamber 13 is delimited to the bottom by a transverse wall 14 which forms the base of the chamber. A seal 15 is provided in the region of the chamber 13 and seals the shaft 10 with respect to the inner housing part 2.

The propeller 4 is seated on the shaft 10, below the transverse wall 14. The inner housing part 2 is delimited to the bottom by a lower closure component 16 which is flow-optimized with regard to its outer contour and reaches to into the inlet opening 5. The upper end of the inner housing part 2 is formed by an upper closure component 17 which is likewise flow-optimized and through which the supply cable 9 is led out upwards.

The axial pump is essentially rotationally symmetrical with respect to its middle longitudinal axis 18 which is arranged essentially vertically on operation of the pump. As is evident from FIG. 2, the inner housing part 2 in the region of the chamber comprises a lower opening 19 as well as, at a distance thereabove, an upper opening 20. The openings 19 and 20 are designed as threaded bores and are closed with a closure plug 21 for the lower opening and 22 for the upper opening, in each case in the form of cap screws. The lower opening 19 lies directly above the transverse wall 14, the base of the chamber 13, which delimits the chamber 13 to the bottom. The upper opening 20 lies at a distance above this, and specifically above the seal 15. The chamber 13 is envisaged for receiving an oil buffer which surrounds the seal 15 or is arranged in front of this. The oil buffer does not completely fill the chamber 13 but only up to above the seal 15, so that the fluid level of the oil buffer is located just below the upper opening 20 given a correct operation.

Figure 2:
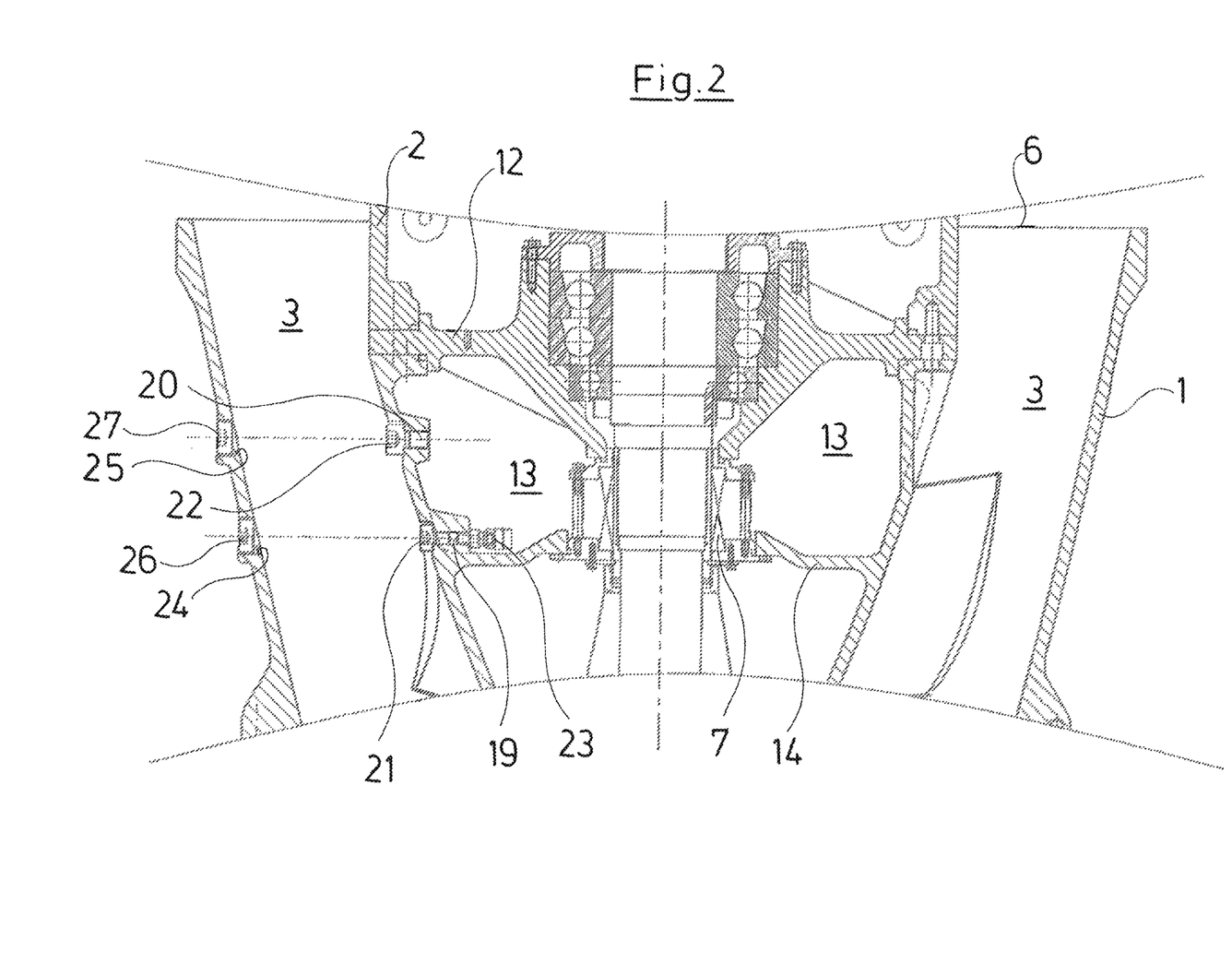
FIG. 2 is a partial view of the longitudinal section according to FIG. 1, in an enlarged representation.

A check valve 23 is screwed from the inner side in the lower opening 19 which is closed from the outside by the closure plug 21, and this check valve comprises a valve body which is impinged by spring force and which automatically blocks to the outside in the direction of the lower opening 19 and in the opposite direction can be lifted from its valve seat, i.e. activated to open, by way of pressure impingement or mechanical impingement.

A recess 24 in the form of a bore is provided in the outer housing part 1, in a manner radially aligned to the lower opening 19 in the wall on the inner housing part 2. A recess 25 is provided in the outer housing part 1 in a manner which is radially aligned to the upper opening 20 and this recess is likewise designed as a bore. The recesses 24 and 25 are closed with suitable closure plugs 26 and 27. The recesses 24 and 25 are provided with a thread, into which a corresponding thread of the closure plugs 26 and 27 respectively meshes.

The closure plugs 21 and 22 as well as 26 and 27 are designed such that they are integrated into the housing parts 1 and 2 respectively in a flush manner, in particular on the side which lies to the flow channel 3. One can also select a streamline shape projecting slightly into the flow channel 3, instead of a flush integration.

With an uprightly standing or hanging axial pump, thus if the pump has the position represented in FIG. 1, with which the inlet opening 5 is arranged on the lower side of the pump, the oil buffer located in the chamber 13 can be controlled with regard to the oil level and as well quickly and simply changed, by way of the openings 19 and 20 as well as the recesses 24 and 25. For this, a device is provided which has a longitudinal extended, straight pipe section 28 which at its free end is provided with an outer thread, with which it can be screwed into the thread of the lower opening 19. The pipe section 28 further comprises a control rod 29 which is fastened on its inner side, projects beyond the free and is designed and arranged such that the free end of the control rod 29 activates the valve body of the check valve 23 to open when screwing the free end of the pipe section 28 into the lower opening 19.

Figure 3:
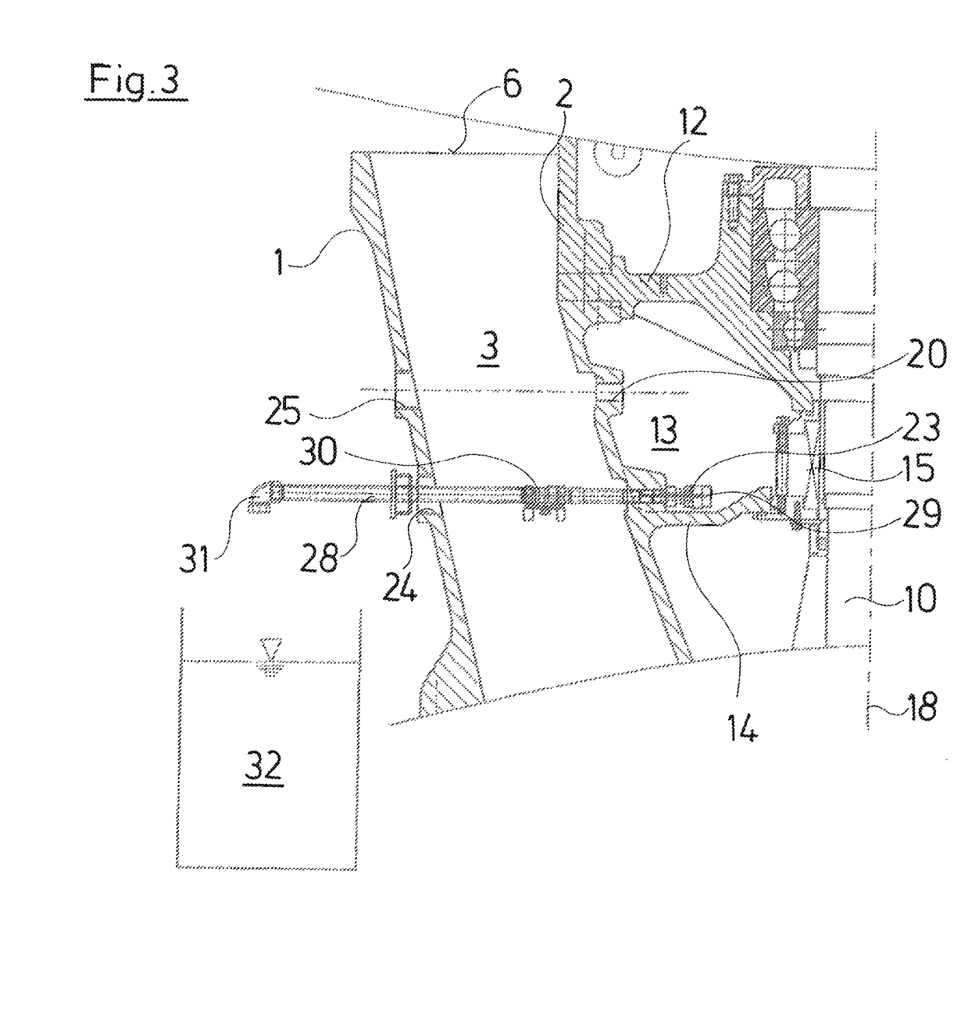
FIG. 3 is a representation according to FIG. 2 showing a pump on draining the oil buffer.

Moreover, the pipe section 28 comprises a shut-off valve 30 as well as a pipe bend 31 at the other end. As is represented by way of FIG. 3, after removing the lower closure plug 26 as well as the closure plug 21, a connection of the pipe section 28 to the lower opening 19 can be created with this device, and with this connection the check valve 23 is simultaneously activated to open by the control rod 29. In this position shown in FIG. 3, the oil buffer can fully run off out of the chamber 13 and be captured in a suitable capture vessel 32 next to the pump. Thereby, usefully the upper closure plug 27 as well as the closure plug 22 is removed from the upper opening 20, so that air can flow after, and this air replaces the volume of the oil which has flowed away through the pipe section 28 out of the chamber 13. As the case may be, the procedure of the drainage of the oil can be accelerated by way of a suction pump being connected onto the end of the pipe section 28 which is free in FIG. 3, or onto the pipe bend 31, and/or gas pressure being applied onto the chamber 13 via the upper opening 20, e.g. by way of a compressor. The shut-off valve 30 thereby serves for permitting the release of drainage procedure or for its completion. It ensures that the buffer oil only remains in the receptacles which are envisaged for this.

Figure 4:
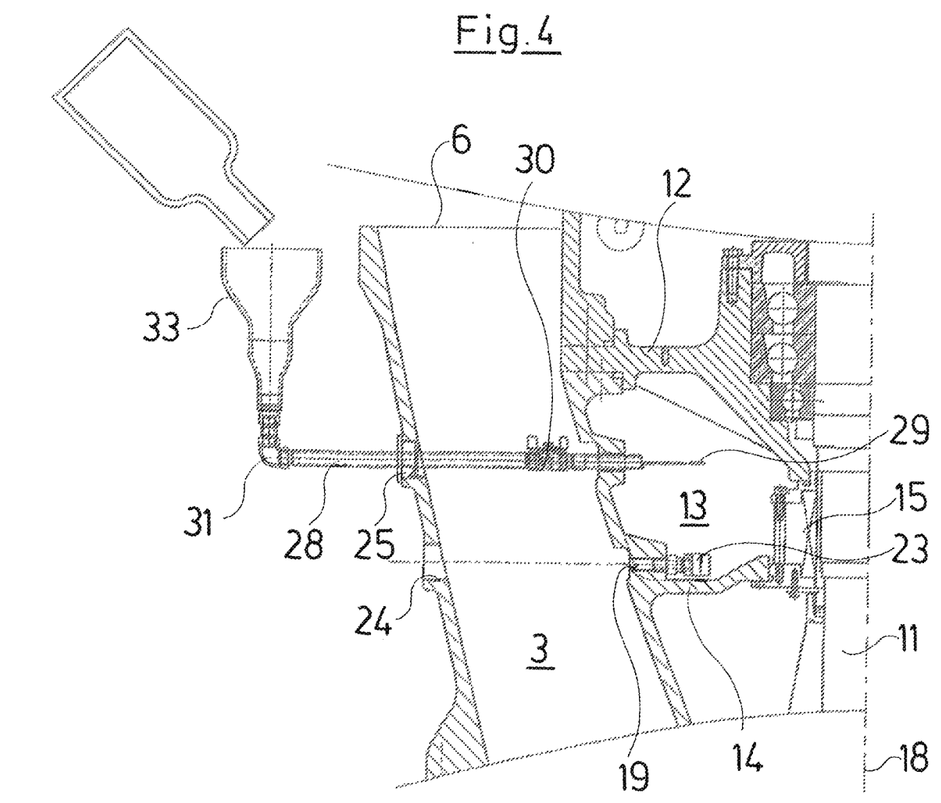
FIG. 4 is a representation according to FIG. 2 showing the pump on filling the oil buffer.

The previously described pipe section 28 with the pipe bend 31, with the control rod 29 and with the thread at the free end can also be used for attachment in the upper opening 20, as represented in FIG. 4, for filling the oil buffer. For this, the pipe bend 31 is to be rotated by 180° and is to be provided with a funnel-like component 33. The lower opening 29 is thereby automatically closed by the check valve 23, so that after the preceding emptying of the oil buffer according to FIG. 3, the chamber 13 can be filled with oil again.

The shut-off valve 30 is designed such that it can be led through the lower as well as through the upper recess 24, 25 including the actuation lever. The actuation of the shut-off valve 30 can either be effected by hand or by way of a tool which is introduced from above via the outlet opening 6.

Figure 5:
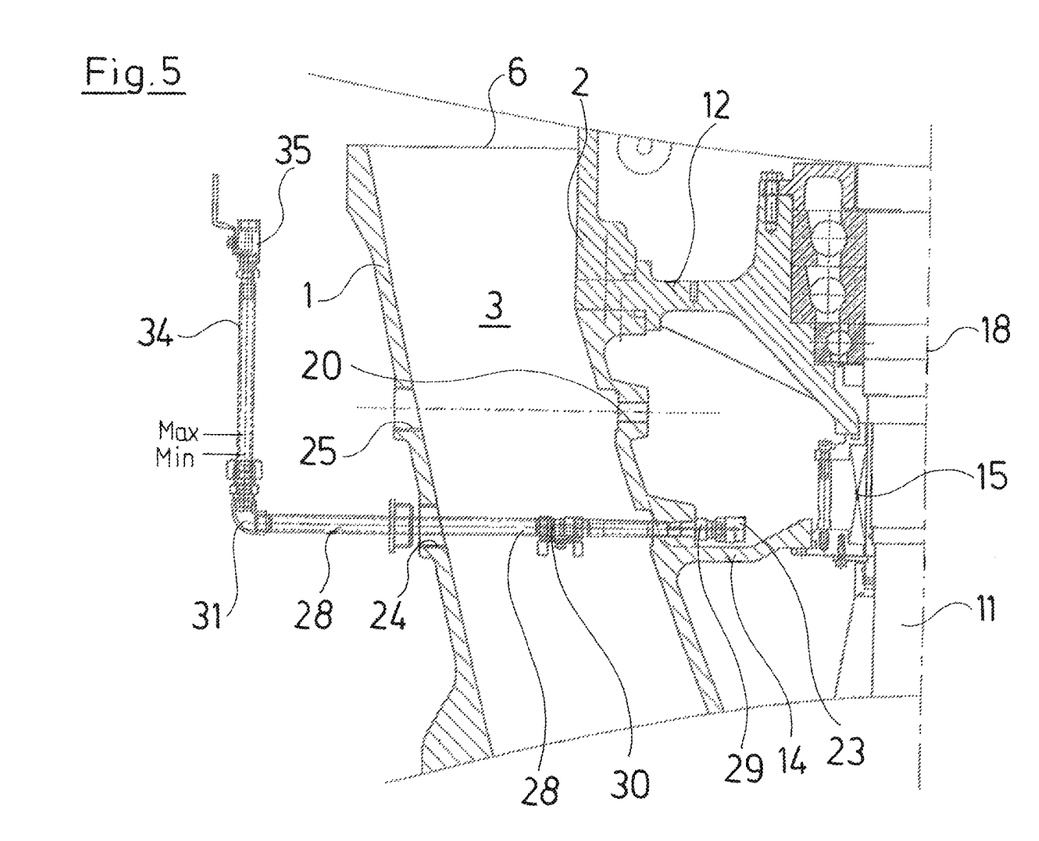
FIG. 5 is a representation according to FIG. 2 showing the pump on controlling the filling level of the oil buffer.

Finally, a filling level control of the chamber 13 can be effected with the help of the previously described pipe section 28 with the control rod 29 at the free end and with the pipe bend 31 at the end which is away therefrom, if a transparent pipe section 34 is screwed onto the pipe bend 31, at the other end of which section a shut-off valve 35 is provided. This device which is modified by the transparent pipe section 34 and the shut-off valve 35, is screwed in the lower opening 19 in the same manner as with the drainage device represented by FIG. 3, but in contrast to the drainage device, with an upwardly directed pipe bend 31 and the transparent pipe section 34 which connects thereto, as is represented by way of FIG. 5. In this position too, the check valve 23 is activated to open by the control rod 29, so that after opening the shut-off valves 30 and 35, the fluid level within the chamber 13 and in the transparent pipe section 34 correspond to one another, so that this can be controlled. Two markings (min, max) are attached in the transparent pipe section 34, on the outer side, by way of which markings one can then read off as to whether the buffer oil level lies within the given limits. The upper opening 20 is thereby opened, in order to ensure a pressure compensation. After the control of the oil level, the shut-off valves 30 and 35 are closed, whereupon the device is screwed out of the lower opening 19 and is pulled through the lower recess 24 out of the pump. Concluding, the closure plugs 21 and 22 for the lower and the upper opening are to be attached as well as the closure plugs 26 and 27 for the recesses 24 and 25, whereupon the pump can be further operated.

For changing the oil buffer in the chamber 13, thus firstly the closure plugs 26 and 27 are removed, as well as subsequently the closure plugs 21 and 22, whereupon the device consisting of the pipe section 28 and the control rod 29 is screwed into the lower opening 19. After opening the shut-off valve 30, the oil buffer flow flows out of the chamber 13 into the capture vessel 32. When this has been fully effected, the device is removed from the lower opening 19 and is fixed in the upper opening 20, moreover the funnel 35 is screwed onto the pipe bend 31, whereupon the filling of the chamber 13 can be effected. If the predefined quantity has been filled, then the device is removed, the openings 19 and 20 provided with their closure plugs 21 and 22, as well as the recesses 24 and 25 closed by closure plugs 26 and 27.

While specific embodiments of the invention have been shown and described in detail to illustrate the application of the principles of the invention, it will be understood that the invention may be embodied otherwise without departing from such principles.

The invention claimed is:

1. A flow machine axial pump operated in a standing manner, the flow machine comprising:
   an inner housing part;
   a propeller wheel;
   a shaft carrying the propeller wheel, the shaft being mounted in the inner housing;
   an outer housing part, wherein a flow path for the fluid delivered by the propeller wheel is formed between the inner and outer housing part, the outer housing part surrounding the inner housing part, and the inner housing part is configured to receive a fluid buffer for at least one seal and comprises at least one opening for the supply and drainage of the fluid buffer, wherein a recess is provided in the outer housing part, via which recess the least one opening is accessible from outside of the outer housing; and
   a valve in or on the inner housing part, with which valve a conduit leading through the least one opening can be blocked.

2. A flow machine according to claim 1, wherein the valve is a controllable check valve.

3. A flow machine according to claim 1, wherein the housing parts are arranged rotationally symmetrically around a vertical middle longitudinal axis of the flow machine, and the recess is arranged in a manner radially aligned to the least one opening.

4. A flow machine according to claim 1, wherein a receptacle for the fluid buffer is formed within the inner housing part, and the least one opening is arranged at the height of the base of the receptacle.

5. A flow machine according to claim 1, wherein above the least one opening, a closable further (upper) opening is provided in the inner housing part, and a further recess is provided in the outer housing part in a manner radially aligned thereto.

6. A flow machine according to claim 1, wherein the openings or the recesses or both the opening and the recess are closable in each case by a closure body and the closure body, at least towards the flow path, is integrated into the housing in an aligned manner.

7. A flow machine according to claim 6, further comprising a water sensor integrated in the closure body for one of the openings of the inner housing part.

8. A flow machine according to claim 6, wherein the recesses or openings or both the recesses and the openings are provided with an inner thread, into which an outer thread of the associated closure body meshes.

9. A method for controlling the fluid level of the fluid buffer of a seal of a flow machine axial pump operated in a standing manner, the method comprising the steps of
   providing the flow machine so as to comprise an inner housing part, a propeller wheel, a shaft carrying the propeller wheel, the shaft being mounted in the inner housing, an outer housing part, wherein a flow path for the fluid delivered by the propeller wheel is formed between the inner and outer housing part, and the inner housing part is configured to receive a fluid buffer for at least one seal and comprises at least one opening for the supply and drainage of the fluid buffer, wherein a recess is provided in the outer housing part, via which recess the opening is accessible from outside of the outer housing, and a pump-side valve in or on the inner housing part, with which pump-side valve a conduit leading through the opening can be blocked;
   after removal of one or more closure bodies, a pipe section of a fluid level control device is led from the outside through the recess in the outer housing part and is fixed in the opening which is aligned thereto and which is in the inner housing part;
   the pump-side valve in or on the opening and one or more fluid level valves of the fluid level control device are activated in an opening manner;
   the fluid level within the inner housing part is determined by way of the device;
   the pump-side and fluid level valves are activated in a closing manner and the fluid level control device is removed; and
   the previously removed closure bodies are inserted again.

10. A method according to claim 9, further comprising:
    providing the pipe section with an outer thread at a free end of the pipe section, wherein a tubular section at another end comprises a transparent section which is arranged bent by 90° and is with at least one marking.

11. A method according to claim 10, wherein the pipe section close at least to one end is provided with a shut-off valve.

12. A method for draining the fluid buffer of a seal of a flow machine, in particular of an axial pump operated in a standing manner, the method comprising the steps of:
- providing the flow machine so as to comprise an inner housing part, a propeller wheel, a shaft carrying the propeller wheel, the shaft being mounted in the inner housing, an outer housing part, wherein a flow path for the fluid delivered by the propeller wheel is formed between the inner and outer housing part, and the inner housing part is configured to receive a fluid buffer for at least one seal and comprises at least one opening for the supply and drainage of the fluid buffer, wherein a recess is provided in the outer housing part, via which recess the least one opening is accessible from outside of the outer housing, and a pump-side valve in or on the inner housing part, with which pump-side valve a conduit leading through the least one opening can be blocked;
- after removal of one or more closure bodies, a pipe section is led from the outside through the recess in the outer housing part and is fixed in the least one opening which is aligned thereto and which is in the inner housing part, wherein the pump-side valve is activated in an opening manner and the fluid is removed through the pipe section out of the pump housing.

13. A method according to claim 12, wherein:
- above the least one opening, a closable further (upper) opening is provided in the inner housing part, and a further recess is provided in the outer housing part in a manner radially aligned thereto;
- for the drainage of fluid, firstly one of the closure bodies is removed from the further recess in the outer housing part, whereupon the closure body closing the upper opening of the inner housing part is removed and the closure bodies are attached again after the fluid drainage.

14. A method according to claim 13, wherein the pipe section with an outer thread at the free end of the pipe section is bent by 90° at an other end and is provided with a funnel-shaped section.

15. A method according to claim 12, the pipe section has an outer thread at a free end of the pipe section, with a rod-shaped part which lies within a contour which is formed by the outer thread and the rod-shaped part projects beyond the outer thread in the axial direction, and the pipe section further comprising a shut-off valve.

16. A method for filling the fluid buffer of a seal of an axial pump operated in a standing manner, the method comprising the steps of:
- providing the flow machine so as to comprise an inner housing part, a propeller wheel, a shaft carrying the propeller wheel, the shaft being mounted in the inner housing, an outer housing part, wherein a flow path for the fluid delivered by the propeller wheel is formed between the inner and outer housing part, and the inner housing part is configured to receive a fluid buffer for at least one seal and comprises at least one opening for the supply and drainage of the fluid buffer, wherein a recess is provided in the outer housing part, via which recess the least one opening is accessible from outside of the outer housing, and a pump-side valve in or on the inner housing part, with which pump-side valve a conduit leading through the least one opening can be blocked;
- a closure body is removed from the recess in the outer housing part, whereupon a closure body is removed from the at least one opening of the inner housing part, and a pipe section is led from the outside through the recess in the outer housing part and is fixed in the opening which is aligned thereto and which is in the inner housing part, whereupon the filling with fluid is effected through the pipe section and that after the filling with fluid, the pipe section is removed and the closure bodies are attached.

* * * * *